Feb. 20, 1923.
H. W. ALDEN.
DIFFERENTIAL CONSTRUCTION.
FILED JUNE 29, 1921.
1,445,865.
2 SHEETS—SHEET 1.
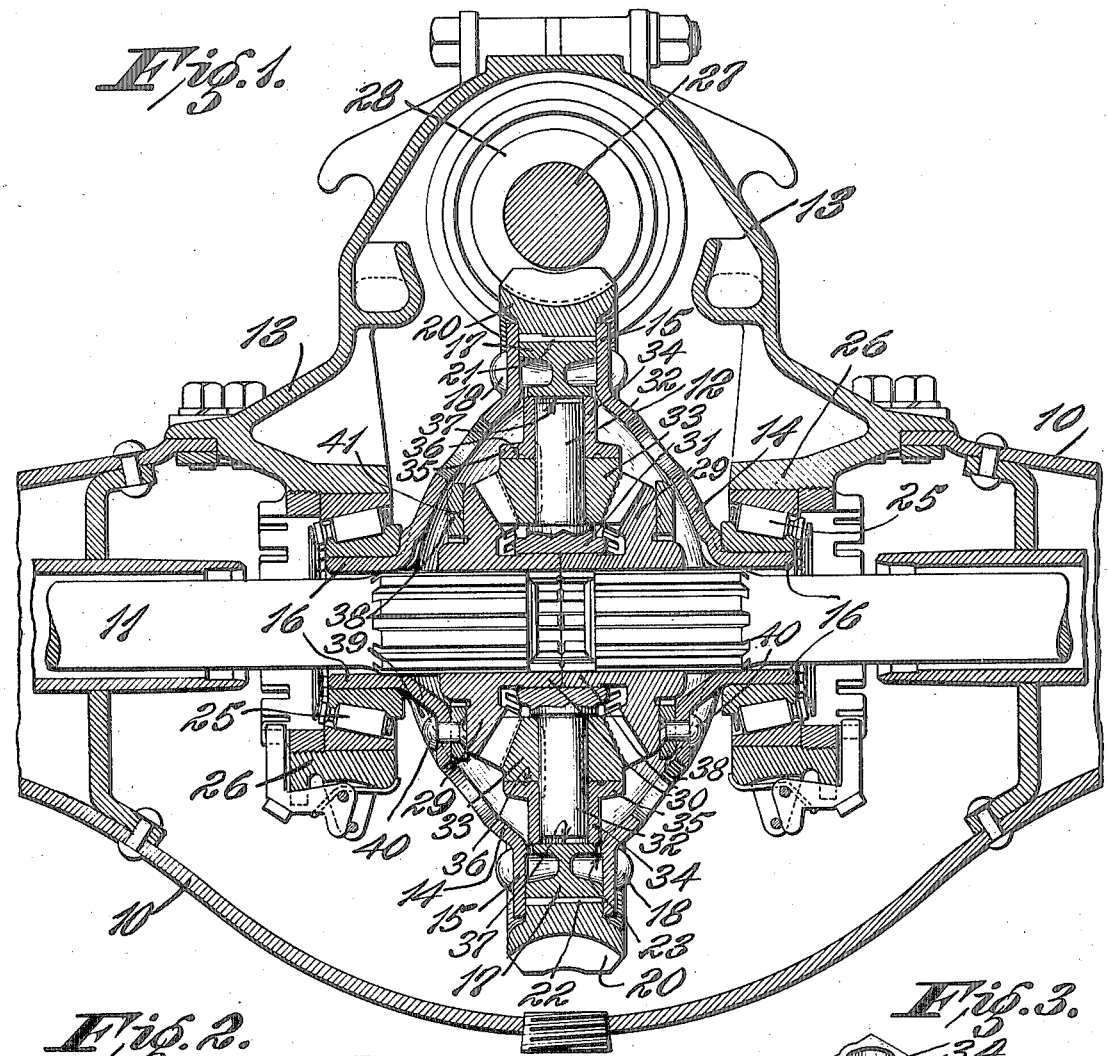
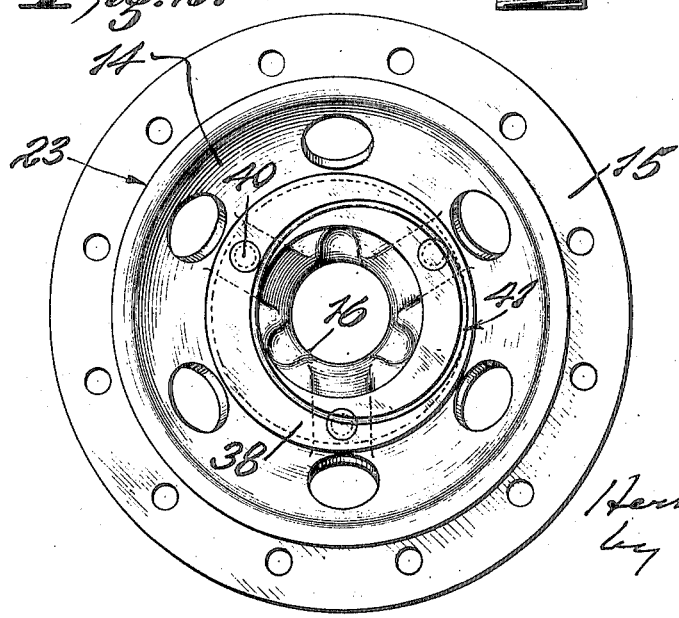
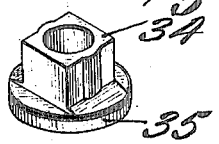
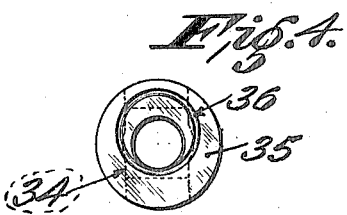
Inventor:
Herbert W. Alden,
by Carrett Carrett
his Attorneys.

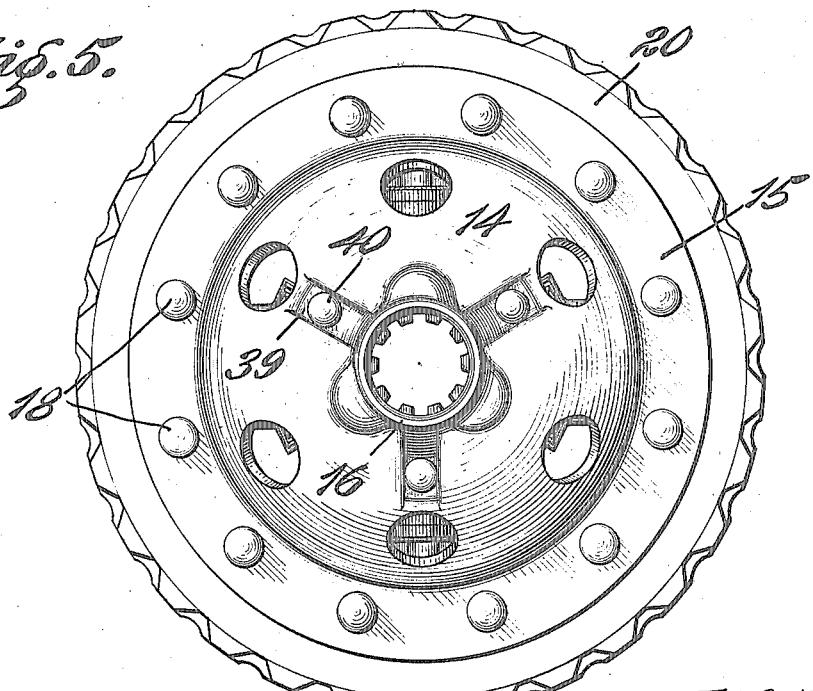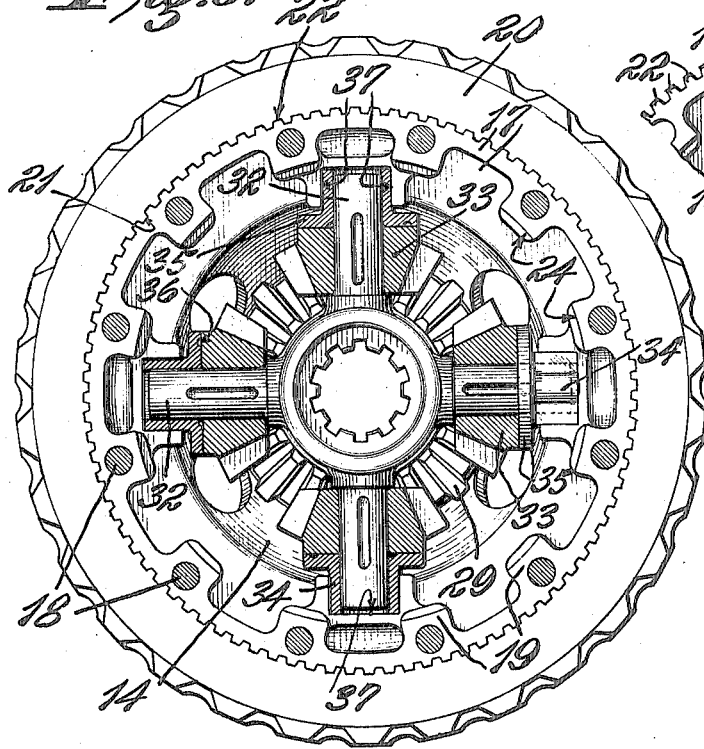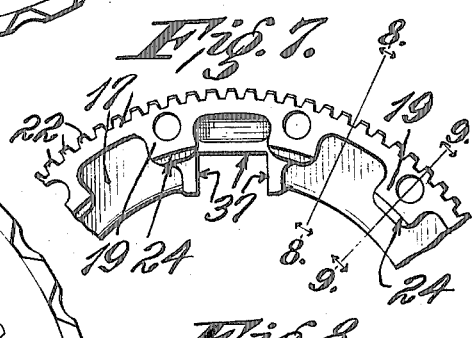

Patented Feb. 20, 1923.

1,445,865

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

DIFFERENTIAL CONSTRUCTION.

Application filed June 29, 1921. Serial No. 481,294.

*To all whom it may concern:*

Be it known that I, HERBERT W. ALDEN, a citizen of the United States, and a resident of the city of Detroit, in the county of Wayne and State of Michigan, have invented a new and useful Improvement in Differential Constructions, of which the following is a specification.

This invention relates to differential constructions for the driving axles of motor vehicles and particularly to the manner of mounting the differential pinions, whereby said pinions are permitted to move longitudinally of the axle for purposes of obtaining the proper intermeshing of said pinions with the differential side gears.

One of the principal objects of the present invention is to provide a simple, inexpensive and efficient means for slidably mounting the pinions of the differential gear for movement longitudinally of axles for the trucks of from two to five tons capacity. Another object is to transmit the driving strains from the differential driving gear ring to the differential spider without increasing the distance between the inner and outer circumferences of said gear ring, whereby a considerable amount of bronze is saved, and without lengthening the spider arm. Other objects are to permit the use of a pressed steel differential case, thereby eliminating the use of malleable iron castings for this purpose and the expensive operation of accurately machining these parts and to obtain other advantages hereinafter appearing.

The invention consists in the combinations and arangements of parts hereinafter described and claimed.

In the accompanying drawings, which form part of this specification, and wherein like symbols refer to like parts wherever they occur, Fig. 1 is a vertical longitudinal section through the middle portion of a driving axle provided with a differential construction embodying my invention;

Fig. 2 is an inside face view of one of the half-sections of the differential gear case;

Fig. 3 is a perspective view of one of the slide-blocks which slidably connect the outer ends of the arms of the differential spider to the driving gear;

Fig. 4 is an end view of one of said blocks looking towards the flange which limits the outward movement of the differential pinions;

Fig. 5 is an end view of the assembled differential gear case with the driving gear secured thereto;

Fig. 6 is a vertical central cross-section through the differential case, the spider, center piece, gear ring and one of the slide-blocks being shown in elevation;

Fig. 7 is a fragmentary side elevation of the ring member of the differential gear case in the region of one of the slideways; and Figs. 8 and 9 are cross-sectional views through said ring member on the lines 8—8 and 9—9, respectively, in Fig. 6.

The driving axle shown in the accompanying drawings comprises a tubular axle housing 10, within which are mounted driving shaft sections 11 disposed with their inner ends spaced apart and having road wheels (not shown) fixed to their outer ends. The middle portion of the axle housing is enlarged to provide space for a globular differential gear case 12, and said enlarged portion is provided at its top with an opening, whereby said case may be inserted and withdrawn. Said opening is closed by means of a gear carrier 13 which is bolted or otherwise removably secured to the top of the housing.

The differential case 12 comprises duplicate half-sections in the form of substantially hemispherical pressed-steel shells 14, which are provided at their large end with circumferential flanges 15 disposed perpendicularly to the axle. The pressed-steel half-sections are provided at their smaller ends with axially extending annular hub portions 16, which loosely surround the driving shafts and are disposed concentric therewith.

The half-sections of the differential gear case are spaced apart axially a sufficient distance to permit a differential gear case ring 17 of substantially T-shaped section to be inserted between the opposed circumferential flanges 15 thereof. The half-sections are firmly held together with the gear case ring therebetween by means of rivets 18, which pass through the flanges 15 and a series of radially spaced lugs 19 which project inwardly from the rim portion of said ring.

The driving member of the differential gear case comprises a worm gear ring 20, preferably of bronze, which encircles the differential gear case ring. A series of shallow splines or ribs are formed around the inner circumference of the worm gear 20, forming a series of internal teeth 21 which mesh with similarly formed teeth 22 on the peripheral edge of the differential case ring 17. This arrangement forces the gear case ring 17 to rotate with the gear ring 20. Relative axial movement of the worm gear ring and the gear case ring is prevented by means of the flanges 15 of the half-sections, which flanges extend across the circular joint between said gear and said ring.

The half-sections and gear case ring are held concentric with respect to each other during assembly by means of annular recesses formed in the opposing faces of the flanges 15 of the half-sections, said recesses forming shoulders 23 which bear against shoulders 24 formed in the inner edges of the lugs 19 of the gear case ring.

The tubular hub portions 16 of the differential case are rotatably supported in roller bearings 25 that are disposed in axial alinement with the driving shafts 11 and are mounted in depending pedestals or journal boxes 26 of the gear carrier 13. The differential case is rotated about the axis of the driving shafts by means of worm drive shaft 27, which is disposed at right angles to said driving shafts and has a worm 28 formed thereon which meshes with the worm gear ring 20 fixed to said case. The worm drive shaft is journaled in bearings mounted in the upper portion of the gear carrier and is adapted to be connected with the usual changeable speed transmission gear (not shown).

Within the gear case are located the two driven side gears 29 of the differential gear. These gears have abutting hub portions 30 which are journaled within the axial bore of the annular body portion of a differential spider 31 which is provided with radially extended studs or spindles 32. The hub portions of the gears 30 have longitudinal slots or keyways formed therein adapted to cooperate with corresponding portions of the driving shafts, whereby said shafts are adapted to be driven by said gears and are removable axially therefrom.

The two bevel side gears 30 of the differential gear mesh with a series of beveled pinions 33 that are journaled on the spindle portions 32 of the spider 31, which is located between said side gears and rotatably supports the same.

Mounted on the outer ends of the radially extending arms 32 of the spider 31 are pinion blocks 34 having central circular openings extending therethrough, whereby they may be slipped over the ends of said arms. The blocks are provided with circular base flanges 35 which bear against the rear faces of the pinions 33; and said base flanges are provided with circular oil grooves 36 whose centers are offset with respect to the openings which extend through said blocks.

The pinion blocks are slidably fitted in channels or sideways 37 formed in the intermediate annular member 17 of the differential gear case. These channels extend longitudinally of the axis of the member and open inwardly towards the axis of said member.

Movement of the side gears away from each other is limited by means of rings 38. These rings are located within the differential casing, concentrically with the axis thereof, and are secured to the half-sections at flat depressions 39 in the hemispherical walls thereof by means of rivets 40.

The thrust rings 38 surround the hubs at the outer ends of the side gears 30 and bear against the back faces thereof, the surfaces of the rings which engage the side gears having circular oil grooves 41 formed therein, whose centers are offset with respect to the centers of said rings.

The use of the malleable iron intermediate gear case ring 17 with differential constructions having bronze driving gear rings of large diameter results in a considerable saving of bronze and greatly cheapens the cost of manufacture. Also, the square slide-blocks 34, which slidably connect the spider arms to the gear case ring, present a large flat surface for transmitting the driving strains from the driving gear directly to the spider, whereby the rivets which secure the half-sections and gear case ring together are relieved of the driving strains, thereby permitting the use of pressed steel half-sections. The slide-blocks 34, while permitting movement of the spider longitudinally of their axes whereby the pinions journaled thereon are permitted to float between the side gears and automatically center themselves therebetween, serve also as a means for limiting the outward movement of said pinions.

The only parts of the half-sections that contact with the differential gears are the thrust washers, which limit the outward movement of the side gears. In consequence of this arrangement, the half-sections need not be accurately made or machined, the only important dimensions being the distance between the thrust washers and the distance between the back faces of the side gears, the first mentioned dimension being controlled by the thickness of the thrust washers.

It is evident that numerous changes may be made without departing from my invention and I do not wish to be limited to the precise construction shown and described.

What I claim is:—

1. A differential construction comprising a driving gear, a pinion supporting member inside of said ring, pinions on said supporting member and driven gears on opposite sides of said pinions and cooperating therewith, said driving gear comprising an outer ring of bronze or like metal having gear teeth and an inner ring of steel or the like mechanically interlocked with said first mentioned ring, and said pinion supporting member having interlocking engagement with said inner ring to rotate therewith but being slidable axially relative thereto.

2. A differential construction comprising a driving gear member provided with a plurality of axially extending slideways, blocks slidably mounted in said slideways, and a spider having spindles extending into said blocks so as to rotate with said gear and be slidable longitudinally with relation to the axis thereof, said spindles being adapted to rotatably support differential gear pinions.

3. A differential construction comprising a driving gear ring member having a plurality of axially extending slideways formed therein, blocks slidably mounted in said slideways, driven gears and a spider having radial spindles that engage said slide-blocks and pinions rotatably mounted on said spindles, and means secured to the said gear ring and extending across the ends of said slideways for limiting the sliding movement of said blocks, whereby said pinions can adjust themselves relative to the driven gears.

4. A differential construction comprising a globular gear case and a driving gear secured to said case, said gear case having a plurality of axially extending slideways formed therein perforated slide-blocks in said slideways, and a spider having radial spindles extending into the perforations of said slide-blocks and adapted to rotatably support differential gear pinions.

5. A differential construction comprising a driving gear ring member having axially extending slideways formed in the inner circumference thereof, slide-blocks in said slideways, and spindles mounted in said slide-blocks and projecting radially therefrom with respect to the axis of said gear ring, said spindles adapted to rotatably support differential gear pinions.

6. A differential construction comprising a driving gear ring member having axially extending slideways formed in the inner circumference thereof, slide-blocks in said slideways, spindles mounted in said slide-blocks and projecting radially therefrom with respect to the axis of said gear ring member, said spindles being adapted to rotatably support differential gear pinions, and means secured to the opposite sides of said gear ring for closing the ends of said slideways, said means constituting hubs for said gear ring member.

7. A differential construction comprising a driving member, said member comprising concentric inner and outer rings removably secured together, said outer ring having gear teeth formed thereon and said inner ring having axially extending slideways formed therein, slide-blocks in said slideways, and spindles extending radially inward from said blocks and adapted to rotatably support differential gear pinions.

8. A differential construction comprising a driving gear ring having a plurality of radially spaced slideways at its inner circumference and extending parallel to the axis thereof, perforated slide-blocks in said slideways, and a differential spider within said gear ring concentric with the axis thereof and having radially extending spindle portions adapted to rotatably support differential gear pinions, said spindle portions being adapted to extend into the perforations in said slide-blocks, whereby said spider together with the pinions thereon is adapted to rotate with said gear and move axially thereof.

9. A differential construction comprising a driving gear ring having a plurality of radially spaced slideways at its inner circumference and extending parallel to the axis thereof, perforated slide-blocks in said slideways, a differential spider within said gear ring concentrically with the axis thereof and having radially extending spindle portions adapted to rotatably support differential gear pinions, said spindle portions being adapted to extend into the perforations in said slide-blocks, whereby said spider together with the pinions thereon is adapted to rotate with said gear and move axially thereof, and a differential gear case comprising half-sections secured to the opposite sides of said gear ring and adapted to close the ends of the slideways thereof.

10. A differential construction comprising a driving gear ring having a series of radially spaced axially extending slideways formed in its inner circumference, perforated slide-blocks mounted in said slideways, a spider within said ring, said spider having a hub portion disposed concentrically with the axis of said gear provided with radially extending spindle portions extending into the perforations in said slide-blocks, differential pinions journaled on the spindle portions of said spider between the hub portion thereof and said slide-blocks, differential side gears disposed on opposite sides of said pinions and meshing therewith, said side gears having hub portions journaled on the hub portion of said spider, and a differential gear case enclosing said differential gears, said gear case comprising half-sections secured to the opposite sides of said driving gear ring and having hub portions whereby said casing is adapted to be rotatably supported, said half-sections being adapted to close the ends of the slideways in said gear ring.

11. A differential construction comprising a driving member, said member comprising concentric inner and outer rings removably secured together, said outer ring having gear teeth formed on its peripheral surface and said inner ring having radially spaced axially extending slideways formed in its inner circumference, perforated slide-blocks mounted in said slideways, a spider disposed within the inner ring of said driving member, said spider having a hub portion disposed concentrically with the axis of said driving member and provided with radially extending spindle portions whose outer ends extend into the perforations in said slide-blocks, differential pinions journaled on said spindle portions between said hub portions and said side-blocks, differential side gears disposed on opposite sides of said pinions and meshing therewith, said side gears having abutting hub portions journaled in the hub portion of said spider, a differential gear case enclosing said differential gears, said case comprising half-sections secured to the opposite sides of the inner ring of said driving gear member and having hub portions whereby said case is adapted to be rotatably supported, said half-sections being adapted to cover the ends of the slideways in said inner ring and the joint between said inner and outer rings, and thrust washers secured to the said half-sections and adapted to engage said side gears to limit the movement of said gears away from each other.

Signed at Detroit, Michigan, this 17th day of June, 1921.

HERBERT W. ALDEN.